United States Patent [19]

Gurien et al.

[11] 3,764,629

[45] Oct. 9, 1973

[54] PROCESS FOR THE PREPARATION OF PYROCATECHOLS

[75] Inventors: Harvey Gurien, Maplewood; Albert Israel Rachlin, both of Verona, N.J.

[73] Assignee: Hoffmann-La Roche Inc., Nutley, N.J.

[22] Filed: June 22, 1970

[21] Appl. No.: 48,476

Related U.S. Application Data

[63] Continuation-in-part of Ser. No. 730,920, May 21, 1968, abandoned.

[52] U.S. Cl.......... 260/621 R, 260/592, 260/613 D, 260/625
[51] Int. Cl............................................ C07c 37/00
[58] Field of Search................. 260/593, 621 R, 625

[56] References Cited
UNITED STATES PATENTS

| | | | |
|---|---|---|---|
| 3,585,243 | 6/1971 | Gradeff....................... | 260/621 G X |
| 2,644,014 | 6/1953 | Saunders......................... | 260/621 G |
| 2,395,638 | 2/1946 | Milas........................... | 260/621 G X |
| 3,354,221 | 11/1967 | Sandis et al................. | 260/621 R X |

*Primary Examiner*—Leon Zitver
*Assistant Examiner*—Norman A. Morgenstern
*Attorney*—Samuel L. Welt, Jon S. Saxe, Bernard S. Leon, George M. Gould and William H. Epstein

[57] ABSTRACT

The preparation of lower alkyl substituted pyrocatechol compounds by reacting a substituted phenolic ketone with an aqueous alkali metal carbonate-hydrogen peroxide solution. The pyrocatechol compounds are useful as intermediates in the preparation of pharmaceutically active compounds such as anti-bacterials, coccidiostats, and antioxidants.

4 Claims, No Drawings

PROCESS FOR THE PREPARATION OF PYROCATECHOLS

CROSS-REFERENCES

This application is a continuation-in-part of copending application, Ser. No. 730,920, filed by Harvey Gurien and Albert Israel Rachlin on May 21, 1968 now abandoned.

BACKGROUND OF THE INVENTION

This invention relates to a new process for preparing known compounds, namely, pyrocatechols of the formula

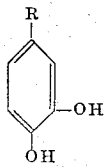

Formula I wherein R is lower alkyl.

Many of the pyrocatechol compounds of Formula I are, for example, useful as intermediates in the production of pharmaceutically active compounds such as antibacterials, coccidiostats, antioxidants, etc.

Although several methods are known for the preparation of pyrocatechol compounds of Formula I, no heretofore known method produces the pyrocatechols in high yields. For example, one method which has been reported in the synthesis of 3,4-dimethylpyrocatechol from 2,3-dimethyl-6-acetylphenol using an alkali sodium hydroxide hydrogen peroxide solution. This method, however, suffers from the disadvantage in that the yields are low, i.e. 2.5 percent. See Baker et al., J. Chem. Soc. 1953, 1615. Another method which has been reported is the synthesis of 3,4-dimethoxy-pyrocatechol from 2,3-dimethoxy-6-acetylphenol utilizing an alkali quarternary hydroxide hydrogen peroxide solution. This method is similarly disadvantageous in that the yields are low, i.e. 25 percent. See Baker et al., J. Chem. Soc. 1934, 1681. With such yields, meither process has been proven to be of commercial interest.

Accordingly, it is of great interest to obtain the pyrocatechol compounds of Formula I by a commercially economic prosess in generally high yields so as to facilitate their use as intermediates for pharmaceutically active compounds.

SUMMARY OF THE INVENTION

The pyrocatechol compounds of Formula I can be produced in generally high yields from a substituted phenolic ketone utilizing the process of the present invention.

Specifically, the pyrocatechol compounds of Formula I can be prepared by reacting a substituted phenolic ketone of the formula

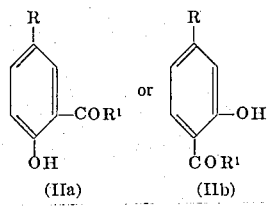

wherein R is as above defined, and
R$^1$ is lower alkyl,
with an aqueous alkali metal carbonate-hydrogen peroxide solution. This reaction effects replacement of the acyl group to yield the desired pyrocatechol compounds of Formula I.

As used herein, lower alkyl comprehends alkyl groups containing anywhere from one to six carbon atoms, e.g., methyl, ethyl, N-propyl, butyl, and the like.

As noted above, R and R$^1$ can each represent a lower alkyl group. In a preferred embodiment, R and R$^1$ will each represent a methyl group.

As noted, the compounds encompassed by Formula I can be produced by reacting a compound of Formula II with an aqueous alkaline hydrogen peroxide solution. The reaction is suitably conducted at a temperature of from about 15° to about 40°C. utilizing as the alkali, a carbonate compound such as sodium carbonate, potassium carbonate or lithium carbonate. A preferred embodiment utilizes sodium carbonate. The reaction is suitably initiated at room temperature (i.e. from about 20° to 25°C.) and thereafter maintained at from about 25° to about 40°C. Preferably, the reaction is conducted at a temperature of from about 30° to about 35°C. in the presence of a lower alkanol (e.g., methanol, ethanol, isopropanol, N-propanol, butanol, etc.). In a preferred embodiment, the reaction is conducted in the presence of ethanol.

The reaction also suitably proceeds utilizing the compounds of Formula II in a molar ratio of from about 2:1 to about 2:3 per mol of carbonate compound. Likewise, the molar ratio of hydrogen peroxide to carbonate compound is suitably from about 1:1 to about 3:1 preferably, about 2:1.

Varying the molar proportions of the quantities of the starting materials (i.e. compounds of Formula II) to the carbonate compound and hydrogen peroxide to the carbonate compound will, of course, affect the yield of the resultant product. Good yields of pyrocatechol compounds of Formula I are obtained when, for example, a compound of Formula II to the carbonate compound is present in a molar ratio of 1:1 and the ratio of hydrogen peroxide to the carbonate compound is 2:1. Excellent yields of pyrocatechol compounds are obtained when; for example, a compound of Formula II to the carbonate compound is present in a molar ratio of 1:1 and the ratio of hydrogen peroxide to the carbonate compounds is 2:1. In a preferred embodiment, the molar ratio of 3,4-dihydroxytoluene to sodium carbonate is 1:1 and the ratio of hydrogen peroxide to sodium carbonate is 2:1.

Preparation of the starting materials of Formula II can, for example, be effected by a multi-step route which comprises, for example, treating a mixture of meta-para cresols with an acylating agent to substitute an acyl group for the hydroxy group. This synthetic route is conveniently summarized in the following scheme:

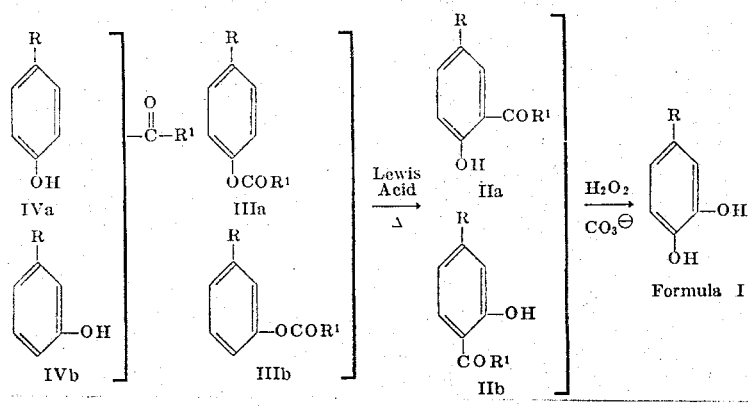

Formula I

With respect to the acylating agents utilized in the first step of the multi-step process for preparing the starting material of Formula II, suitable acylating agents include the anhydrides and acid chlorides of the aliphatic acids having from 2 to 6 carbon atoms; preferably 2 to 3 carbon atoms. In a preferred embodiment, the acylating agent will be acetic anhydride or acetyl chloride.

Although inert solvents may be utilized in the practice of the above initial step of the multi-step process, it is more desirable to employ an excess of the acylating agent to serve as the reaction medium. In a particularly preferred embodiment, the aforesaid initial reaction is conducted at the reflux temperature of the acylating agent. However, lower or higher temperatures may be employed as desired.

The resulting mixture of compounds corresponding to Formula IIIa and IIIb above wherein R¹ is lower alkyl having from 1 to 6 carbon atoms, is next treated with a Lewis acid catalyst to effect a rearrangement to the corresponding compounds of Formula IIa and IIb above. In a preferred embodiment, this reaction is conducted in the absence of a solvent and at a temperature in excess of 165°C. This elevated temperature is necessary order order to get the rearrangement to proceed into the desired position, i.e., ortho to the original acyl group. Examples of Lewis acids which may be used in the aforesaid rearrangement include aluminum chloride and boron trifluoride. In the most preferred embodiment of the present invention, aluminum chloride is the Lewis acid of choice.

In a particular aspect of the present invention, the reaction path proceeding from the compounds IVa and IVb to compound I is accomplished without isolation of the intermediates. Such a procedure allows one to maximize ultimate final yield and to minimize process cost associated with isolation and purification of intermediates.

If desired, the compounds of formula I can be readily converted to the compounds of the formula

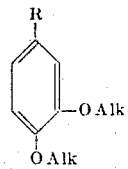

wherein R is as above defined and Alk is a lower alkyl group,
by alkylation with an alkylating agent in a manner well known in the art. Suitable alkylating agents include lower alkyl sulfates, e.g., methyl iodide, dimethyl sulfate, ethyl iodide, etc.

The present invention may be more clearly understood by reference to the following examples. All temperatures disclosed therein are in degrees centigrade.

Example 1

Preparation of 3,4-dihydroxytoluene

Into a 12-liter three-neck flask, equipped with stirrer, thermometer, take-off condenser and under nitrogen was placed 540.5 g. of mixed meta and para cresols, 91 percent pure, equivalent to 492 g. (4.55 moles) of 100 percent material. to this was added 580 g. (5.60 moles, 537 ml.) of 98 percent acetic anhydride, and the resulting mixture was stirred and refluxed (oil bath) for 4 hours. The bath temperature was then slowly raised to 200°, and the excess acetic anhydride and formed acetic acid were distilled. The internal temperature was then adjusted and maintained at 110°–130° and 900g. of anhydrous aluminum chloride was added with mixing in portions with cooling. Upon completion of the addition of the aluminum chloride, the internal temperature was raised to 165°. (The reaction mixture may bcome difficult to stir between 110° and 165°, but is fluid at 165°, and stirring is resumed.) The mixture was stirred at 165° for 1 hour, cooled to 140° (internal temperature), and 2.38 l. of 4 N hydrochloric acid was added slowly while cooling to 90°–95°. The mixture was then stirred for 1 hour at 80°–90°, and then for 3 hours at room temperature. The organic layer was separated, and the aqueous phase was extracted with six 250 ml. portions of toluene. The organic layers were combined, concentrated at reduced pressure to remove the solvent, the residual oil was dissolved in 3.75 l. of ehtanol and transferred to a 22-liter, 3-neck flask equipped with stirrer, condenser and thermometer. To the stirred solution was added, in portions, an alkaline hydrogen peroxide solution previously prepared from 625 ml. of 30 percent hydrogen peroxide (6.12 moles) in 1.75 l. of water and mixed with a solution of carbonate 580 g. of sodium carbonate (5.47 moles) in 3.75 l. of water at 15° and the whole cooled and stored at 0°–5° while awaiting addition. During the addition of the alkaline hydrogen peroxide, the temperature slowly rose, and was kept at 30°–33° by means of external cooling. Upon completion of the addition (45–60 min.), the mixture was stirred for 2 hours at 33°–36°. Sodium bisulfate (50.2 g.) was added portion-wise to destroy the excess hydrogen peroxide as determined by a starch iodide test. The reaction mixutre was cooled while being acidified to pH 2 with 320 ml. of concentrated sulfuric acid and then diluted with 6 l. of water to dissolve the salts formed. The mixture was then extracted with four 500 ml. portions of hexane and then with 12 600 ml. portions of ether. The combined ether extracts were dried over sodium sulfate and concentrated. The residual oil was distilled at reduced pressure. After collection of a forerun (b.p. 38°–115°/20–19 mm.), the main fraction distilled at 149°–157°/17–20 mm., yielding crude 3.4-dihydroxytoluene, m.p. 56.4°–59.9°. Recrystallization was effected from 2.42 l. of 1:1 benzene-hexane. The solution was brought to the boil, cooled slightly, 20.4 g. Norit A was added and the mixture was again brought to the boil and filtered hot. When the cooling filtrate became trubid, it was seeded and allowed to cool with stirring until well crystallized. It was then refrigerated overnight. Upon filtration and washing with 282 ml cold 1:1 benzene-hexane and drying in vacuum at 30°, there was obtained product of m.p. 64°–66°. Removal of the solvent from from the mother liquor gave additional crude product which was dissolved in 550 ml. of 1:1 benzene-hexane at room temperature, seeded and refrigerated overnight. Upon filtration, washing with 100 ml. 1:1 benzene-hexane (cold) and drying in vacuum at 30°, there was obtained an additional crop of product of m.p. 64°–66°. Yield: 90.8 percent.

EXAMPLE 2

Preparation of 3,4dimethoxytoluene

A. From distilled, recrystallized 3,4-dihydroxytoluene

Into a 2-liter, five-neck flask equipped with stirrer, thermometer, pH electrode connected to a pH meter, condenser, two dropping funnels at either side of the flask and under nitrogen were placed 100 g. (0.805 mole) of 3,4-dihydroxytoluene (distilled and recrystallized) and 1 l. of water. One dropping funnel was charged with 290 ml. (2.90 mole) of 10 N sodium hydroxide and the other with 304.5 g. (2.42 mole, 229.5 ml.) of dimethyl sulfate. The internal temperature was adjusted to 30°–35°, and during the course of addition of the reagents, the temperature was maintained in that range by occasional cooling with an external ice bath. The pH was next adjusted to 11.5 by the addition of a portion of the alkali, followed by the addition of the dimethyl sulfate over a period of 1 hour. Concurrently, the alkali was added at such a rate as to maintain the pH at 11–11.5. An additional hour was required to complete the addition of the alkali, while maintaining the indicated pH, after which the pH electrode was removed, the reaction mixture was heated to 95° for 10 minutes, and then cooled to room temperature with an external ice bath. The organic phase was separated and the aqueous phase extracted with six 200 ml. portions of dichloromethane. The combined organic phase was washed with 200 ml. of 1 N sodium hydroxide, 200 ml. of water, dried over anhydrous magnesium sulfate, filtered and concentrated in vacuum to give a light yellow oil. Upon distillation there was obtained 3,4-dimethoxytoluene, b.p. 106.5°–110°/12.5 mm, m.p. 21.2°; $n_D^{23.5} = 1.5268$. Yield: 96.5 percent of theory form 3,4-dihydroxytoluene.

B. From distilled, unrecrystallized 3,4-dihydroxytoluene

Into a 500-ml., five-neck flask equipped with stirrer, thermometer, pH electrode and meter, two dropping funnels and under nitrogen was placed 24.2 g. (0.195 mole) of 3,4-dihydroxytoluene (distilled, unrecrystallized of 98.0 percent purity), 244 ml. of water, and the temperature was brought to 30°–35°. Into the dropping funnels (arranged to avoid prior mixing as in A above) were placed 70 ml. of 10 N sodium hydroxide and 56.5 ml. (0.584 mole) of dimethyl sulfate. A quantity of the alkali was added to pH 11–11.5. The dimethyl sulfate and sodium hydroxide were then added dropwise and concurrently at rates such that the temperature and pH were maintained at 30°–35° and 11–11.5, respectively. The addition was complete in 20 minutes. After stirring at 30°–35° for an additional 45 minutes, the pH electrode was removed and the reaction mixture was heated to 95°, while the residual sodium hydroxide was added (10–15 minutes) and held at this temperature for 10 minutes. The flask was next cooled externally to room temperature. The organic phase was separated and the aqueous phase was extracted with four 50 ml. portions of methylene chloride. The combined organic extracts were washed with 50 ml. of 1 N sodium hydroxide and 50 ml. of water. After drying over anhydrous magnesium sulfate, the organic phase was concentrated and distilled to give product of b.p. 112/114°/18mm. $n_D^{22} = 1.5307$.
Yield: 87.5%

EXAMPLE 3

Preparation of 3,4-diethoxytoluene

Into a 250-ml., five-neck flask equipped with stirrer, thermometer, two dropping funnels and pH meter, under nitrogen were placed 12.4 g. (0.10 mole) of 3,4-dihydroxytoluene (distilled, recrystallized) and 125 ml. of water. The dropping funnels were charged with 61.6 g. (0.40 mole) of freshly distilled diethyl sulfate and 48.0 ml. of 10 N (0.48 mole) sodium hydroxide, respectively. While maintaining the temperature at 30°–35°, the sodium hydroxide and diethyl sulfate were concurrently added dropwise at a rate such that the pH was maintained at 11.0–11.5. The addition of the diethyl sulfate required 30 minutes. The pH meter was removed and the mixture was heated to 95° as the remainder of the alkali was added. It was held at 95° for 10 minutes and then cooled to room temperature. The organic layer was separated and the aqueous phase was extracted with six 25 ml. portions of methylene chloride. The combined organic phases were washed with 25 ml. of 1 N sodium hydroxide and then with 25 ml. of water. After drying over anhydrous magnesium sulfate and removal of the solvent, the crude porduct weighed 17.6 g. Upon distillation, 16.6 g. of 3,4-diethoxytoluene was obtained, b.p. 109°–114°/8.9 mm.

We claim:

1. A process for the preparation of a dihydroxy compound of the formula:

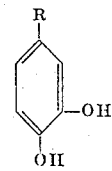

wherein R is lower alkyl;
comprising reacting at a temperature of from 15° centigrade to 40° centigrade, a ketone of the formula:

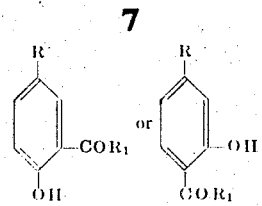

wherein $R_1$ is lower alkyl; and R is as above;
with an aqueous solution containing an alkali metal carbonate and a hydrogen peroxide wherein the mole ratio of said ketone to the alkali metal carbonate is from about 2:1 to about 2:3 and the mole ratio of hydrogen peroxide to the alkali metal carbonate is from about 1:1 to about 3:1.

2. The process of claim 1 wherein R is methyl.

3. The process of claim 1 wherein the reaction proceeds in the presence of a lower alkanol.

4. The process of claim 1 wherein the alkaline metal carbonate is sodium carbonate.

* * * * *